(12) United States Patent
Dietrich

(10) Patent No.: US 11,904,630 B1
(45) Date of Patent: Feb. 20, 2024

(54) BICYCLE HUB AND SPOKE ARRANGEMENT

(71) Applicant: Rolf Dietrich, Toledo, OH (US)

(72) Inventor: Rolf Dietrich, Toledo, OH (US)

(*) Notice: Subject to any disclaimer, the term of this patent is extended or adjusted under 35 U.S.C. 154(b) by 0 days.

(21) Appl. No.: 18/330,148

(22) Filed: Jun. 6, 2023

(51) Int. Cl.
*B60B 1/04* (2006.01)
*B60B 1/00* (2006.01)

(52) U.S. Cl.
CPC .............. *B60B 1/042* (2013.01); *B60B 1/003* (2013.01); *B60B 1/041* (2013.01)

(58) Field of Classification Search
CPC B60B 1/042; B60B 1/041; B60B 1/04; B60B 1/003
See application file for complete search history.

(56) References Cited

U.S. PATENT DOCUMENTS

| | | | |
|---|---|---|---|
| 380,358 A * | 4/1888 | Smith et al. | B60B 1/042 301/59 |
| 452,046 A * | 5/1891 | Mather | B60B 1/042 301/55 |
| 671,778 A | 4/1901 | Sams | |
| 705,121 A * | 7/1902 | Newton | B60B 1/042 301/58 |
| 725,014 A | 4/1903 | Westover | |
| 886,565 A | 5/1908 | Williams et al. | |
| 918,118 A * | 4/1909 | Blean | B60B 1/042 301/59 |
| 1,064,066 A | 6/1913 | Funk | |
| 1,160,223 A | 11/1915 | Wagenhorst | |
| 1,216,474 A * | 2/1917 | Lindsay | B60B 3/16 301/36.1 |
| 1,450,064 A | 3/1923 | Dodds | |
| 1,475,161 A | 11/1923 | Wagenhorst | |
| 1,476,780 A | 12/1923 | Van Meter | |
| 1,558,126 A | 10/1925 | Stoler | |
| 1,578,076 A | 3/1926 | Cook | |
| 1,660,319 A | 2/1928 | Ash | |
| 2,937,905 A | 5/1960 | Altenburger | |
| 3,008,770 A | 11/1961 | Mueller | |
| 3,894,777 A | 7/1975 | Yamada | |

(Continued)

FOREIGN PATENT DOCUMENTS

| | | |
|---|---|---|
| DE | 398372 C | 7/1924 |
| DE | 583902 C | 9/1933 |

(Continued)

*Primary Examiner* — Jason R Bellinger
(74) *Attorney, Agent, or Firm* — C. Fred Charpie, III; Ward Law Office LLC

(57) ABSTRACT

A bicycle hub and spoke arrangement is provided. The bicycle hub and spoke arrangement includes a bicycle axle supported for rotation by a hub shaft. A plurality of flanges extend radially from the hub shaft. Each of the plurality of flanges has a plurality of apertures. A plurality of spokes, each having a first end, an opposing second end and a body extending therebetween. The second end of each of the plurality of spokes is connected to an outer rim. The first end of each of the plurality of spokes is connected to one of the plurality of circumferentially oriented apertures of the plurality of flanges in a manner such as to create three areas of contact between the first end of each of the plurality of spokes and the associated flange, thereby strengthening a J bend area of the spoke and address spoke failure and shimmy.

2 Claims, 9 Drawing Sheets

(56) References Cited

U.S. PATENT DOCUMENTS

| | | | |
|---|---|---|---|
| 4,300,804 A * | 11/1981 | Hasebe | B60B 27/023 301/110.5 |
| 4,583,787 A | 4/1986 | Michelotti | |
| 4,626,036 A | 12/1986 | Hinsberg et al. | |
| 4,729,605 A | 3/1988 | Imao et al. | |
| 4,844,552 A | 7/1989 | Tsygankov et al. | |
| 5,061,013 A | 10/1991 | Hed et al. | |
| 5,104,199 A | 4/1992 | Schlanger | |
| 5,350,221 A | 9/1994 | Pearce et al. | |
| 5,769,584 A * | 6/1998 | Claes | B60B 1/042 301/58 |
| 5,779,323 A * | 7/1998 | Burrows | B60B 1/0246 301/58 |
| 6,068,348 A | 5/2000 | Okajima et al. | |
| 6,189,978 B1 | 2/2001 | Lacombe et al. | |
| 6,431,035 B1 | 8/2002 | Hendrikse et al. | |
| 6,568,767 B2 * | 5/2003 | Meggiolan | B60B 1/042 301/110.5 |
| 7,651,172 B2 * | 1/2010 | Meggiolan | B60B 1/023 301/59 |
| 10,737,529 B2 * | 8/2020 | Fidelfatti | B60B 1/003 |
| 10,773,544 B2 * | 9/2020 | Chang | B60B 1/003 |
| 2003/0062763 A1 | 4/2003 | Dietrich | |
| 2004/0155518 A1 | 8/2004 | Schlanger | |

FOREIGN PATENT DOCUMENTS

| | | | | |
|---|---|---|---|---|
| DE | 155602 A1 | 6/1982 | | |
| FR | 425730 A | 6/1911 | | |
| FR | 874167 A | 7/1942 | | |
| FR | 1019285 A | 1/1953 | | |
| FR | 2378642 B1 | 11/1983 | | |
| GB | 04449 A | 2/1895 | | |
| GB | 13973 A | 8/1896 | | |
| GB | 22441 A | 7/1898 | | |
| GB | 19499 A | 12/1899 | | |
| GB | 09844 A | 4/1911 | | |
| GB | 854546 A | 11/1960 | | |
| JP | 56154301 A | * | 11/1981 | B60B 1/042 |

* cited by examiner

BICYCLE HUB AND SPOKE ARRANGEMENT

FIELD

The present disclosure relates generally to bicycle wheels and, more particularly, to a novel bicycle hub and spoke arrangement configured to provide increased resistance to the breakage of the spokes due to vibration and load cycling during wheel rotation under load.

INTRODUCTION

This section provides background information related to the present disclosure which is not necessarily prior art.

Conventional bicycles are well known as having two wheels supported for rotation by a frame. Typically, the wheels are arranged with one behind the other. The frame includes handlebars for steering, a seat and opposing pedals. The opposing pedals are connected by a chain to the rear most wheel. When the rider pushes on the pedals, the chain moves thereby causing the rear most wheel to turn The bicycle stays upright while moving forward by being steered so as to keep its center of mass over the wheels. The rider usually provides the steering.

It is known for the wheels to be formed with a hub and spoke arrangement. In this arrangement, a plurality of spokes connect to opposing flanges of the hub and extend radially and connect to a common outer rim. The spokes are tensioned and configured to hold the hub and transfer the weight of the rider and the bicycle to the wheel. In doing so, the plurality of spokes provide stiffness in the wheel making the wheel more efficient when spinning.

In certain instances, it is known that spokes can fail. There are many causes of spoke failure including the non-limiting examples of uneven tension, stress incurred during hard riding, mixing different types of spokes, impact from potholes, worn and/or aged spokes, load cycling during wheel rotation under load, excess weight of rider and/or bicycle, types of spoke materials and the like.

In other instances, it is known that spokes can fail due to the phenomenon known as "shimmy." Simply, bicycle shimmy can be caused by the left to right and right to left pull of the spokes and the resulting vibration caused therein.

It would be advantageous if the hub and spoke arrangements of bicycles could be improved to better address spoke failure and shimmy.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the bicycle hub and spoke arrangement.

The above objects as well as other objects not specifically enumerated are achieved by a novel bicycle hub and spoke arrangement. The novel bicycle hub and spoke arrangement includes a bicycle axle supported for rotation by a hub shaft. The bicycle axle is configured to support a bicycle wheel for rotation. A plurality of flanges extend radially from the hub shaft. Each of the plurality of flanges has a plurality of circumferentially oriented apertures. A plurality of spokes, each having a first end, an opposing second end and a body extending therebetween. The second end of each of the plurality of spokes is connected to an outer rim. The outer rim is configured to support a tire. The first end of each of the plurality of spokes is connected to one of the plurality of circumferentially oriented apertures of the plurality of flanges in a manner such as to create three areas of contact between the first end of each of the plurality of spokes and the associated flange, the three areas of contact configured to strengthen a J bend area of the spoke and address spoke failure and shimmy.

The above objects as well as other objects not specifically enumerated are also achieved by a novel method of arranging a bicycle hub with a plurality of spokes. The novel method including the steps of supporting a bicycle axle for rotation with a hub shaft, the bicycle axle configured to support a bicycle wheel for rotation, forming the hub shaft with a plurality of radially extending flanges, each of the plurality of flanges having a plurality of circumferentially oriented apertures, connecting a second end of a plurality of spokes to an outer rim, the outer rim configured to support a tire, each of the plurality of spokes having an opposing first end and a body extending between the first end and the second end, and connecting the first end of each of the plurality of spokes to one of the plurality of flanges in a manner such as to create three areas of contact between the first end of each of the plurality of spokes and the associated flange, the three areas of contact configured to strengthen a J bend area of the spoke and address spoke failure and shimmy.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
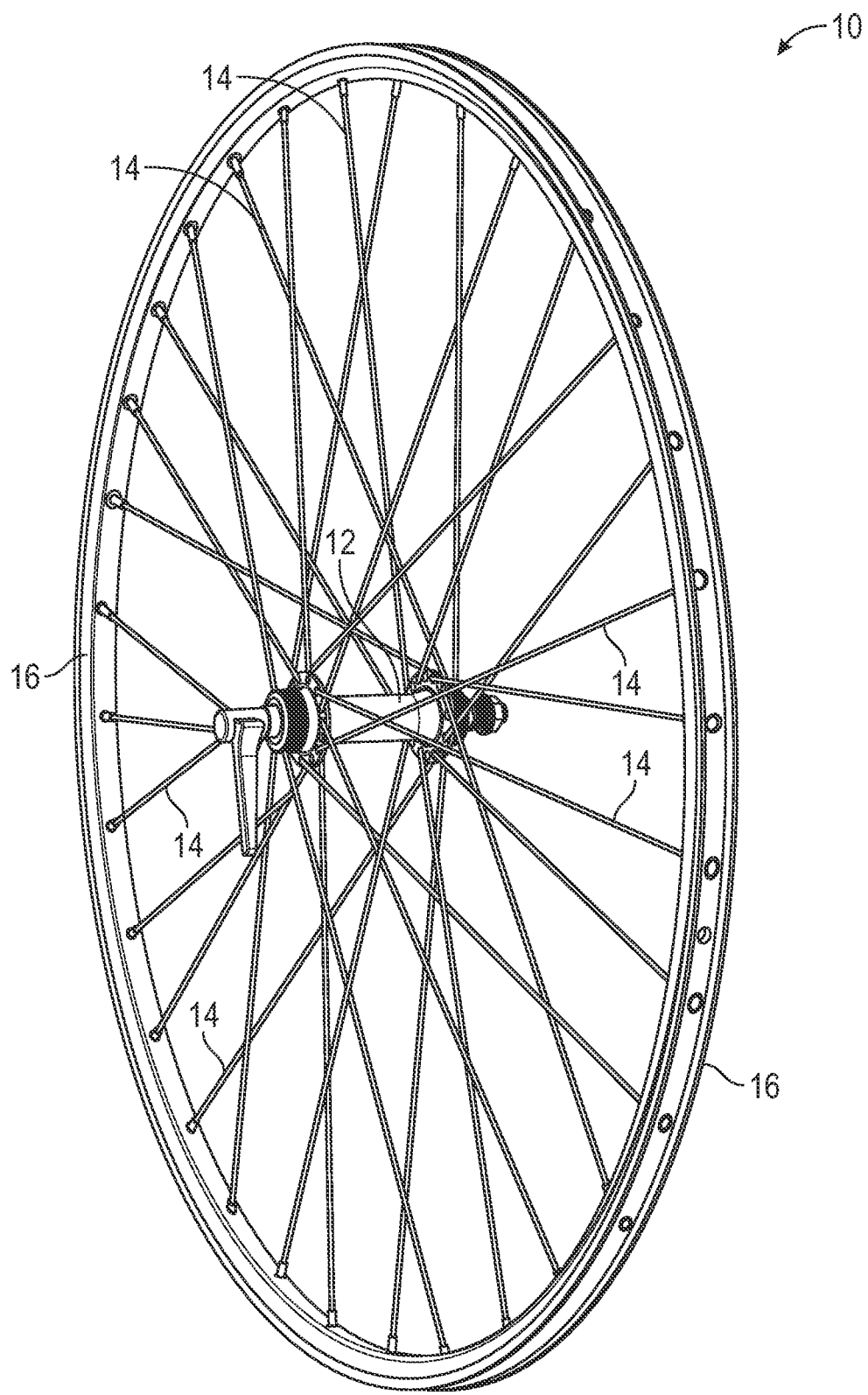
FIG. 1 is a perspective view of a conventional bicycle wheel.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The description and figures disclose a novel bicycle hub and spoke arrangement (hereafter "hub and spoke arrangement"). Generally, the novel hub and spoke arrangement provides three areas of contact between portions of a spoke and a flange extending from the hub. The first area of contact is between a head of the spoke and the flange. The second area of contact occurs between an arcuate inner radius segment of the spoke commonly referred to as the "J" bend area and the flange. The third area of contact occurs between an extension segment of the spoke (downstream from the J bend area) and another area of the flange. It is believed the three areas of contact arrangement between the flanges of the hub and each of the spokes advantageously provides increased resistance to the breakage of the spokes at the J bend area due to vibration and load cycling during wheel rotation under load and also address shimmy.

Referring now to FIG. 1, a bicycle wheel is illustrated generally at 10. The bicycle wheel 10 is conventional in the art and will only be briefly described herein. The bicycle wheel 10 is configured for rotational support by a frame (not shown) and includes a conventional hub 12, a plurality of spokes 14 and a circumferential outer rim 16.

Figure 2:
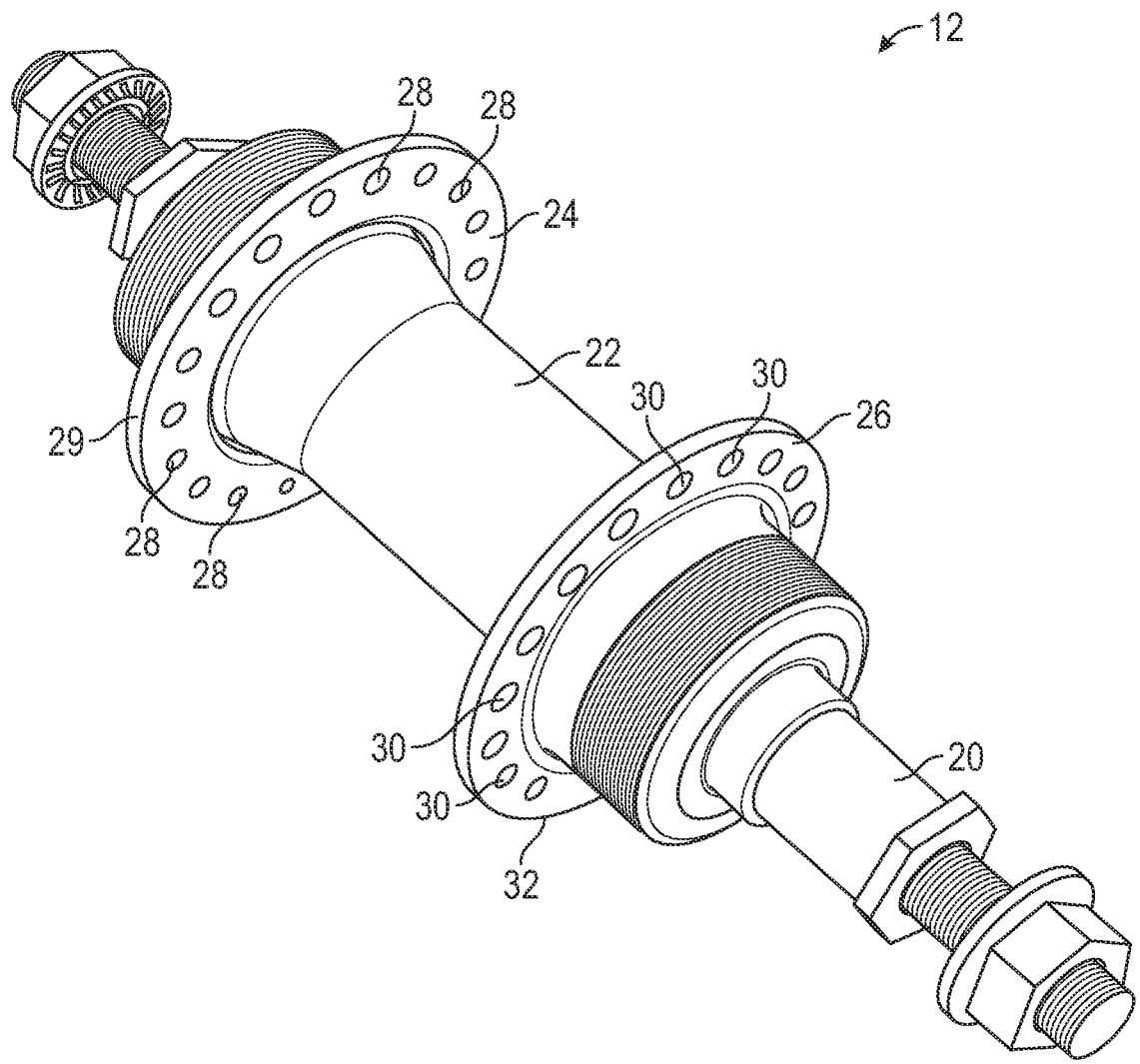
FIG. 2 is a perspective view of a hub of the conventional bicycle wheel of FIG. 1.

Referring now to FIG. 2, the conventional hub 12 includes an axle 20 supported for rotation within a hub shaft 22. Opposing first and second flanges 24, 26 extend radially from the hub shaft 22. The first flange 24 includes a plurality of first flange apertures 28 arranged in a circumferential pattern adjacent an outer perimeter 29 of the first flange 24. In a similar manner, the second flange 26 includes a plurality of second flange apertures 30 arranged in a circumferential pattern adjacent an outer perimeter 32 of the second flange 26. Each of the plurality of first and second flange apertures 28, 30 has a circular cross-sectional shape. As will be discussed in more detail below, each of the plurality of first and second flange apertures 28, 30 is configured to receive a portion of a spoke therethrough and further configured to seat a head of a spoke (reference FIG. 5).

Figures 3A, 3B:
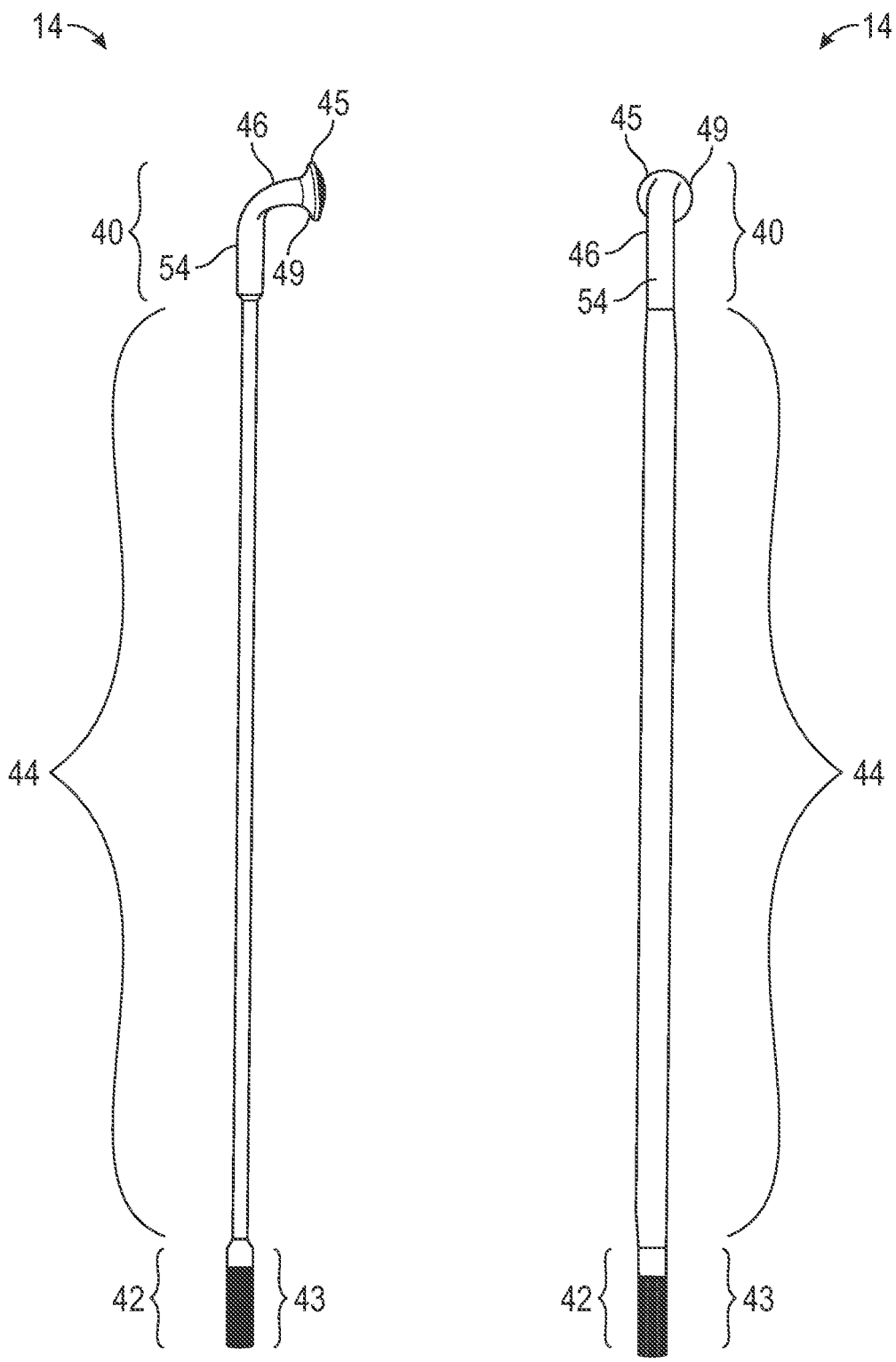
FIG. 3A is a perspective side view of a conventional spoke of the conventional bicycle wheel of FIG. 1.
FIG. 3B is a perspective front view of the conventional spoke of FIG. 3A.

Referring now to FIGS. 3A and 3B, a conventional spoke 14 is illustrated. The spoke 14 includes a first end 40, an opposing second end 42 and a body 44 extending therebetween. The first end 40 includes a head 45, a bent section 46 (commonly called a J bend section), and an extension segment 54. The head 45 includes a tapered portion 49 that connects to the J bend section 46.

Referring again to FIGS. 3A and 3B, the second end 42 of the spoke 14 includes a threaded portion 43. The threaded portion 43 is configured for insertion into apertures in the outer rim 16 (FIG. 1) and further configured to receive a threaded member (not shown) in a manner such as to secure the second end 42 of the spoke 14 to the outer rim 16 (FIG. 1).

Referring again to FIGS. 3A and 3B, the body 44 of the spoke 14 extends from the first end 40 to the second end 42. In the illustrated embodiment, the body 44 has a flat cross-sectional shape, commonly referred to as a blade style of spoke. However, in other embodiments, the body 44 can have other cross-sectional shapes, such as the non-limiting example of a round cross-sectional shape.

Figure 4:
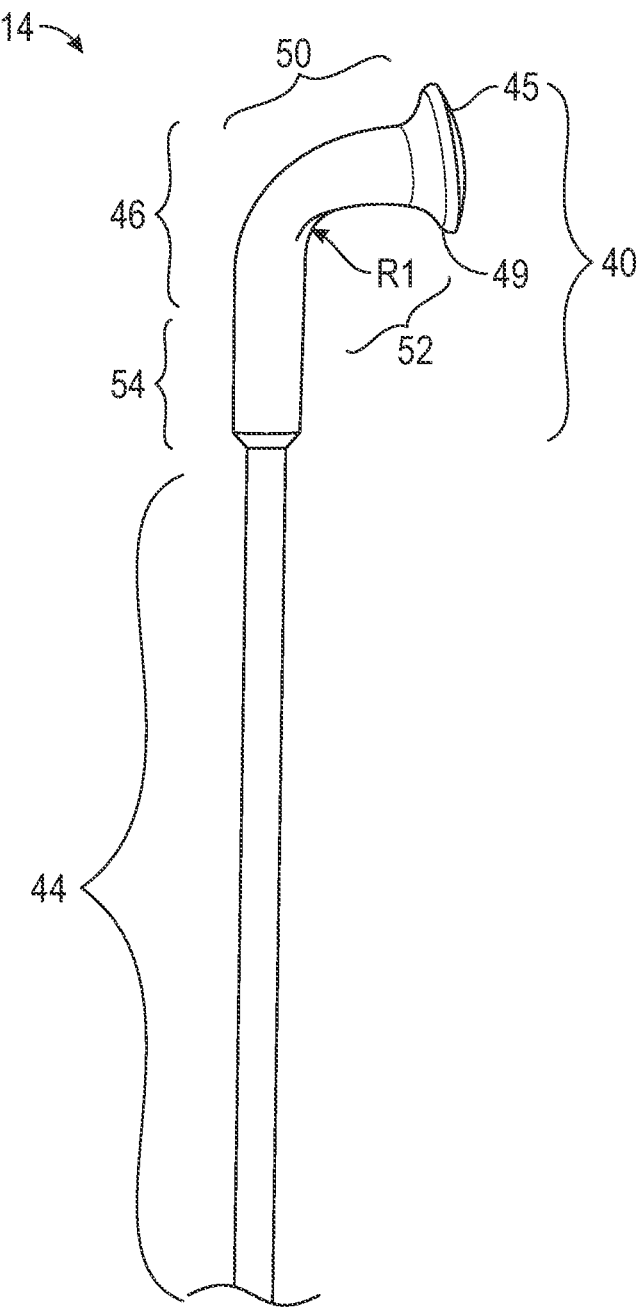
FIG. 4 is an enlarged perspective side view of a portion of the conventional spoke of FIG. 3A.

Referring now to FIG. 4, an enlarged view of the first end 40 of the conventional spoke 14 is illustrated. The J bend section 46 includes a first segment 50 that extends from the tapered portion 49 of the head 45, a radiused segment 52 extending from the first segment 50 to an extension segment 54. The radiused segment 52 has an arcuate inner radius segment 53 having a distance R1.

Figure 5:
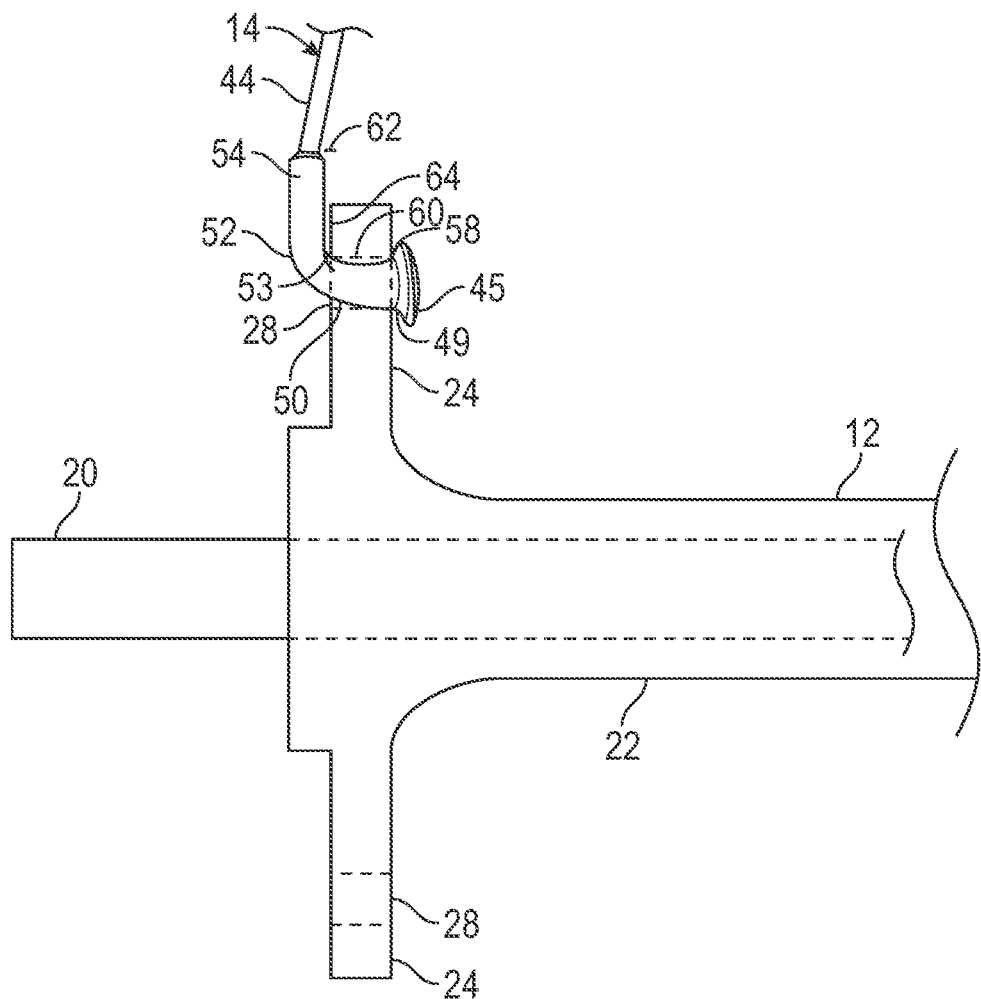
FIG. 5 is a side view of the hub of FIG. 2 illustrating installation of the conventional spoke of FIG. 3A.

Referring now to FIG. 5, a portion of the conventional hub 12 is illustrated with an installed conventional spoke 14 in a "head in" arrangement. The hub 12 includes the axle 20, the hub shaft 22 and the first flange 24. The first flange 24 includes the plurality of circumferential first flange apertures 28. In the "head in" arrangement, the head 45 of the spoke 14 is arranged in an inward position relative to the first flange 24. Further to this arrangement, the tapered portion 49 of the spoke 14 seats in one of the first flange apertures 28, thereby forming a first area of contact 58 between the head 45 of the spoke 14 and the first flange 24. In the installed position, the first segment 50 of the spoke 14 extends through the first flange aperture 28. Also in the installed position, the arcuate inner radius segment 53 of the radiused segment 52 contacts a wall defining the first flange aperture 28, thereby forming a second area of contact 60 between the spoke 14 and the first flange 24.

Referring again to FIG. 5, in the installed arrangement the extension segment 54 extends in a direction away from the radiused segment 52 and toward the outer rim (not shown for purposes of clarity). In the installed arrangement, the extension segment 54 forms a gap 62 with an outer face 64 of the first flange 24. The gap 64 results in a lack of contact between the extension segment 54 of the spoke 14 and the first flange 24. The gap 62 extends continuously along the length of the extension segment 54 from the first flange aperture 28 to the body 44 of the spoke. Without being held to the theory, it is believed the lack of contact and support between the extension segment 54 and the first flange 24 contributes to breakage of the spokes 14 at the J bend section 46 due to vibration and load cycling during wheel rotation under load.

In accordance with the invention, a novel hub and spoke arrangement for a bicycle is presented. Generally, the novel hub and spoke arrangement provides three areas of contact between portions of a spoke and a flange extending from the hub. Without being held to the theory, it is believed the additional third area of contact contributes to the prevention of vibration-related breakage of the spokes at the J bend section due to vibration and load cycling during wheel rotation under load. Advantageously, the three areas of contact arrangement facilitate the use of low spoke counts, with each of the spokes under extremely high static tensions. The use of low spoke counts, each at extremely high static tensions, provides an aerodynamic advantage not seen in conventional hub and spoke arrangements having higher spoke counts with lower spoke static tensions. As will be discussed in more detail below, it should be appreciated that the additional third area of contact can be formed in various manners.

Figure 6:
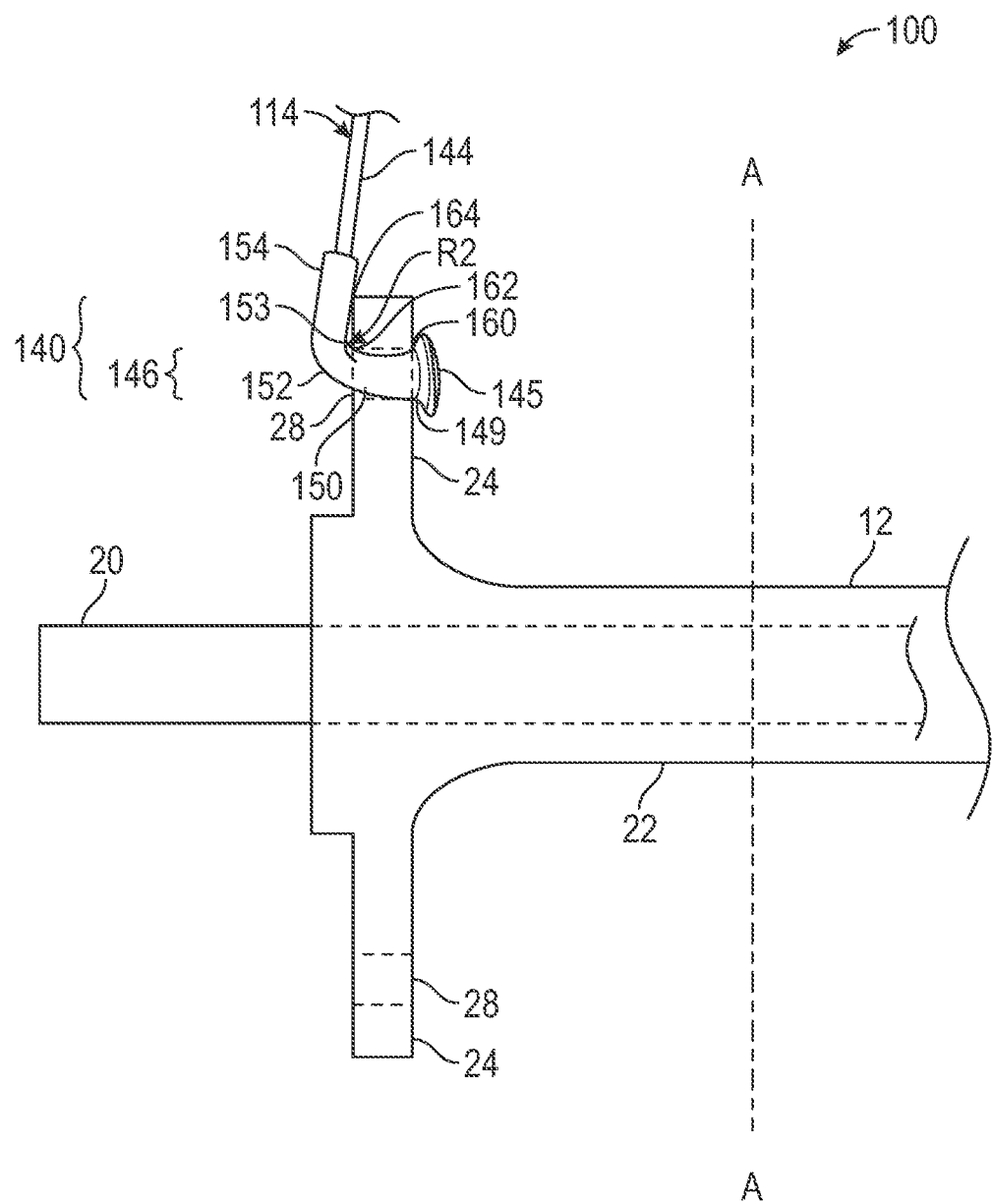
FIG. 6 is a side view of a novel hub and spoke arrangement in accordance with the invention.

Referring now to FIG. 6, a first embodiment of a novel hub and spoke arrangement for a bicycle is shown generally at 100. The novel hub and spoke arrangement 100 includes the conventional axle 20, the hub shaft 22 and the first flange 24. The first flange 24 includes the plurality of circumferential first flange apertures 28 as described above. A spoke 114 includes a first end 140, an opposing second end (not shown for purposes of clarity) and a body 144 extending therebetween. In this embodiment, the spoke 114 is one of a plurality of spokes in a quantity of about 10 to 12 spokes per wheel. Each of the spokes 114 is tensioned in a range of about 300 lbs. to about 500 lbs. However, it should be appreciated in other embodiments, the number of spokes per wheel can be less than about 10 or more than about 12 and the tension of each spoke can be less than about 300 lbs. or more than about 500 lbs., sufficient for the functions described herein. The first end 140 includes a head 145, a J bend section 146 and an extension segment 154. The head 145 includes a tapered portion 149 that extends to a first segment 150. The tapered portion 149 has a circular cross-sectional shape.

Referring again to the embodiment shown in FIG. 6, the J bend section 146 includes the first segment 150 that extends from the tapered portion 149 of the head 145, a radiused segment 152 extending from the first segment 150 to the extension segment 154. The radiused segment 152 has a circular cross-sectional shape and an inner radius 153 having a distance R2. The distance R2 of the radiused segment 152 of the spoke 114 is smaller than the inner radius R1 of the radiused segment 52 of the spoke 14 shown in prior art of FIG. 5. In other words, the smaller inner radius 53 results in closing the arcuate inner radius 153, in contrast to conventional wheel building practices. The smaller radius R2 of the radiused segment 152 of the spoke 114 results in the novel formation of three areas of contact with the first flange 24. The first area of contact, shown at 160, is formed at the area the tapered portion 149 of the head 145 contacts an annular wall defining a first flange aperture 28. The second area of contact, shown at 162, is formed as the arcuate inner radius segment 153 of the radiused segment 152 contacts the same wall defining the first flange aperture 28. The third area of contact, shown at 164, is formed as a portion of the extension section 154 contacts a portion of the first flange 24.

Referring again to FIG. 6, it should be appreciated that the terms "first, second and third areas of contact" can have different configurations depending on the structure of the contacting elements. It is contemplated that the area of contact can be a singular point, a linear segment of contact or a geometrically-shaped contact form. As a first example, the first area of contact 160 is defined above as the location where the tapered portion 149 of the head 145 contacts a wall defining the first flange aperture 28. As the tapered portion 149 of the head 145 has a circular cross-sectional shape and the wall defining the first flange aperture 28 also has a circular cross-sectional shape, it should be appreciated that the "first area of contact" could have the form of a linear segment, in this example an arcuate linear segment, rather than a singular point of contact. As another example, the second area of contact 162 is defined above as the location where the arcuate inner radius segment 153 of the radiused segment 152 contacts the same wall defining the first flange aperture 28. As the arcuate inner radius segment 153 of the radiused segment 152 has a circular cross-sectional shape and the wall defining the first flange aperture 28 also has a circular cross-sectional shape, it should be appreciated that the "second area of contact" could have the form of a linear segment of contact, also in this example an arcuate linear segment rather than a singular point of contact. As a final example, the third area of contact 164 is formed between a portion of the extension section 154 and the first flange 24. In the embodiment shown in FIG. 6, the extension section 154 has a circular cross-sectional shape and the first flange 24 forms a circular outer rim. Accordingly, the third area of contact has the form of a singular point of contact, rather than a linear segment of contact.

Figure 7:
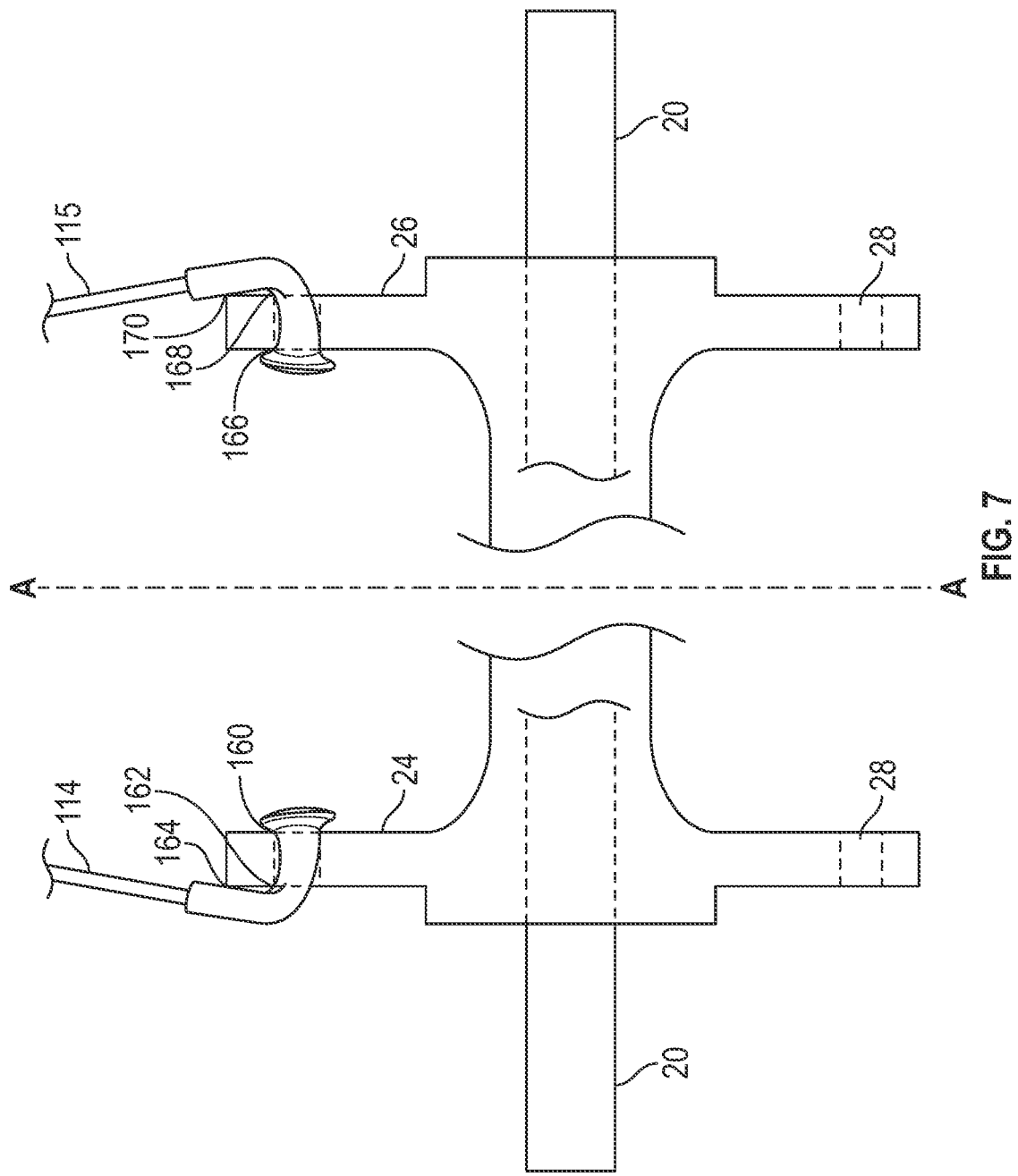
FIG. 7 is a side view of the novel hub and spoke arrangement of FIG. 6, illustrating opposing sets of three areas of contact, in accordance with the invention.

Referring now to FIG. 7, the hub 12 is centered about a vertical plane A-A that includes the outer rim 16 (FIG. 1). The spoke 114, forming the three areas of contact 160, 162 and 164 with the first flange 24 extends to and is connected to the outer rim 16 (FIG. 1). The three areas of contact 160, 162 and 164 are positioned outside the vertical plane A-A. The hub 12 also includes the second flange 26. A second spoke 115 is situated with the second flange 26 in a manner similar to the spoke 114 with the first flange 24 and also forms three areas of contact 166, 168 and 170 with the second flange 26. The three areas of contact 166, 168 and 170 are on opposite sides of the vertical plane A-A as the areas of contact 160, 162 and 164. Without being held to the theory, it is believed that in addition to each of the sets of three contacts 160, 162, 164 and 166, 168, 170 contributing to the prevention of vibration-related breakage of the spokes at the J bend sections due to vibration and load cycling during wheel rotation under load, but also the opposed relationship of the sets of three contacts 160, 162, 164 and 166, 168, 170 on either side of the vertical plane A-A further contributes to the stability provided to the J bend sections during load cycling during wheel rotation under load.

Referring again to the embodiment shown in FIGS. 6 and 7, it should be appreciated that the smaller arcuate inner radius 153 can be formed with various methods. In one non-limiting example, the hub of an assembled wheel incorporating the novel hub and spoke arrangement can be subjected to lateral forces sufficient to displace the hub in a corresponding direction, thereby decreasing the arcuate inner radius of the outward spokes and forcing contact of the extension portions of the spokes with the associated flange. Once the force is applied in the first direction, the hub can be subjected to lateral forces in the opposing direction to affect the decreasing of the arcuate inner radius of the opposing side spokes.

As another non-limiting example of forming the smaller arcuate inner radius, it is contemplated that the spokes can be pre-formed prior to assembly with the hub.

Figure 8:
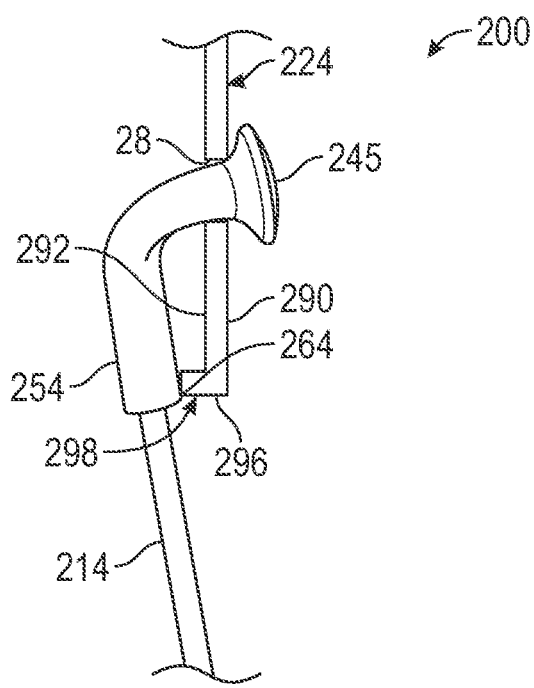
FIG. 8 is a side view of a second embodiment of a novel hub and spoke arrangement.

While the embodiment of the novel hub and spoke arrangement shown in FIGS. 6 and 7 contemplate the use of flanges of conventional hubs, it is further contemplated that the third area of contact can be formed from hubs incorporating other structures, mechanisms and devices. Referring now to FIG. 8, a second embodiment of a novel hub and spoke arrangement is provided at 200. The novel hub and spoke arrangement 200 includes a first flange 224 and a spoke 214. The first flange 224 includes the plurality of circumferential first flange apertures 28 as described above. As described above, a head 245 of the spoke 214 seats within the first flange aperture 28. The first flange 224 includes an inner face 290, an outer face 292 and an outer edge 296. The inner face 290 and the outer face 292 can be substantially parallel with each other, although such is not necessary. The outer edge 296 includes a nub 298, configured to extend from the outer face 292 in a direction toward the extension segment 254. In an installed orientation, the nub 298 contacts the extension segment 254 of the spoke 214, thereby forming a third of contact 264 between the spoke 214 and the first flange 224.

The outer edge 296 includes a nub 298, configured to extend from the outer face 292 in a direction toward the extension segment 254. In an installed orientation, the nub 298 contacts the extension segment 254 of the spoke 214, thereby forming a third of contact 264 between the spoke 214 and the first flange 224.

Figure 9:
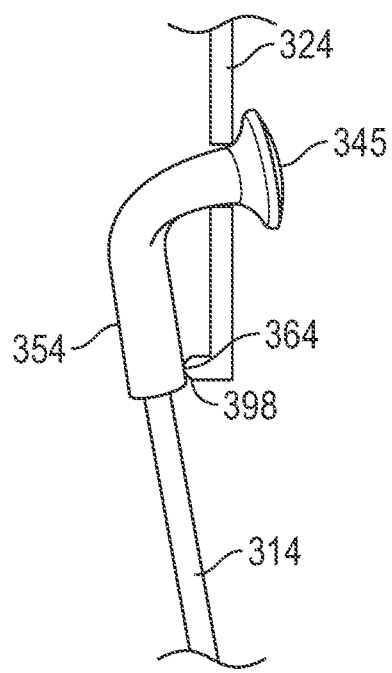
FIG. 9 is a side view of a third embodiment of a novel hub and spoke arrangement.

In the embodiment illustrated in FIG. 8, the nub 298 has a squared cross-sectional shape sufficient to seat against a portion of the extension segment 254. However, in other embodiments, the nub 298 can have other cross-sectional shapes. Referring now to FIG. 9 in another embodiment, a nub 398 formed on a first flange 324 illustrates another non-limiting example in the form of a nub 398 having a rounded cross-sectional shape. It should be apparent that the size and cross-sectional shape of the nub 398 need only to be sufficient to contact the extension segment 354 of the spoke 314, thereby forming the third area of contact 364.

Figure 10:
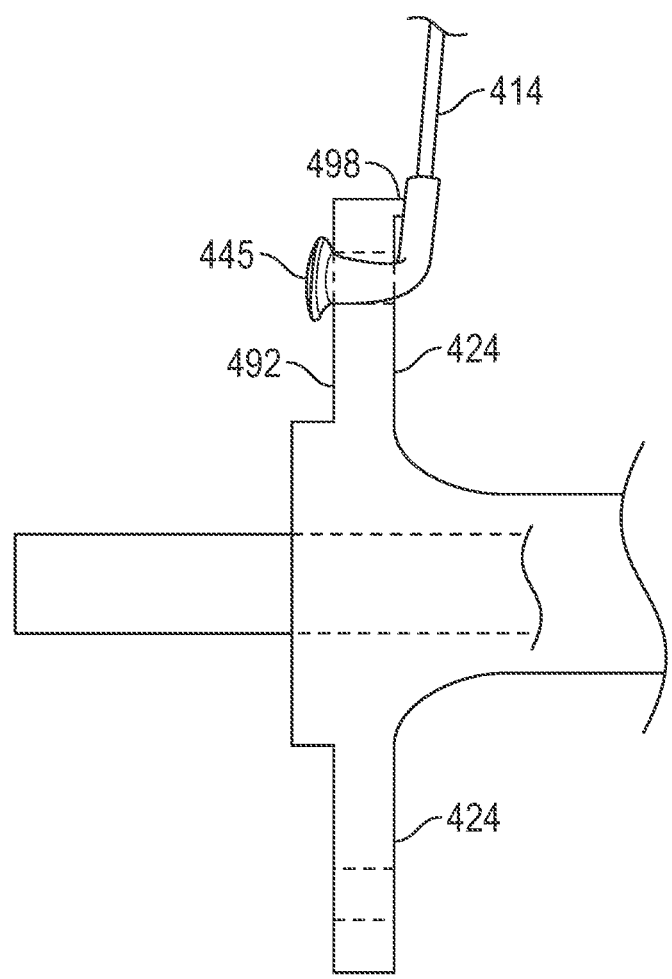
FIG. 10 is a side view of a fourth embodiment of a novel hub and spoke arrangement, illustrating a head out arrangement.

Referring to the embodiments shown in FIGS. 6-9, each of the spokes 114, 214 and 314 has a "head-in" orientation. That is, each of the heads 145, 245 and 345 of the corresponding spokes 114, 214, 314 is arranged in an inward position relative to the associated flange 24, 224 and 324. It should be appreciated that in other embodiments, the heads of each of the spokes can have a "head-out" orientation. That is, the head of each of the spokes is arranged in an outward position relative to an associated flange. Referring now to FIG. 10 in one non-limiting example, the head 445 of each of the spokes 414 is seated adjacent an outer face 492 of the flange 424. As shown in FIG. 10, a nub 498 will be reversed from that shown in FIGS. 8 and 9.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially comparable results.

What is claimed is:

1. A novel bicycle hub and spoke arrangement comprising:
   a bicycle axle supported for rotation by a hub shaft, the bicycle axle configured to support a bicycle wheel for rotation;
   a plurality of flanges extending radially from the hub shaft, each of the plurality of flanges having a plurality of circumferentially arranged apertures; and
   a plurality of spokes, each of the plurality of spokes having a first end, an opposing second end and a body extending therebetween, the second end of each of the plurality of spokes connected to an outer rim, the outer rim configured to support a tire;
   wherein the first end of each of the plurality of spokes is connected to one of the plurality of circumferentially arranged apertures of the plurality of flanges in a manner such as to create three areas of contact between the first end of each of the plurality of spokes and the associated flange, the three areas of contact configured to strengthen a J bend area of the spoke and address spoke failure and shimmy;
   wherein each of the plurality of flanges includes a nub extending therefrom, the nub is configured to contact each of the plurality of spokes in a manner such as to form a third area of contact with each of the plurality of spokes.

2. A novel method of arranging a bicycle hub with a plurality of spokes, the novel method comprising the steps of:
   supporting a bicycle axle for rotation with a hub shaft, the bicycle axle configured to support a bicycle wheel for rotation;
   forming the hub shaft with a plurality of radially extending flanges, each of the plurality of flanges having a plurality of circumferentially arranged apertures;
   connecting a second end of a plurality of spokes to an outer rim, the outer rim configured to support a tire, each of the plurality of spokes having an opposing first end and a body extending between the first end and the second end;
   connecting the first end of each of the plurality of spokes to one of the plurality of flanges in a manner such as to create three areas of contact between the first end of each of the plurality of spokes and the associated flange, the three areas of contact configured to strengthen a J bend area of the spoke and address spoke failure and shimmy; and
   extending a nub from each of the plurality of flanges and configuring each of the nubs to contact each of the plurality of spokes in a manner such as to form a third area of contact with each of the plurality of spokes.

* * * * *